(12) United States Patent
Mishra (10) Patent No.: US 7,925,617 B2
(45) Date of Patent: *Apr. 12, 2011

(54) EFFICIENCY IN PROCESSING QUERIES DIRECTED TO STATIC DATA SETS

(75) Inventor: Amulya Mishra, Andrapradesh (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,652

(22) Filed: Apr. 6, 2010

(65) Prior Publication Data

US 2010/0191730 A1 Jul. 29, 2010

Related U.S. Application Data

(63) Continuation of application No. 10/908,666, filed on May 22, 2005, now Pat. No. 7,725,468.

(30) Foreign Application Priority Data

Apr. 8, 2005 (IN) .............................. 397/CHE/2005

(51) Int. Cl.
*G06F 7/00* (2006.01)
(52) U.S. Cl. ...................................................... 707/601
(58) Field of Classification Search ........................ None
See application file for complete search history.

(56) References Cited

U.S. PATENT DOCUMENTS

| | | | |
|---|---|---|---|
| 5,547,563 A | 8/1996 | Stowe | |
| 6,125,370 A | 9/2000 | Courter et al. | |
| 6,223,182 B1 | 4/2001 | Agarwal et al. | |
| 6,457,000 B1 | 9/2002 | Witkowski et al. | |
| 6,460,043 B1 | 10/2002 | Tabbara et al. | |
| 6,643,644 B1 | 11/2003 | Furusho | |
| 6,665,684 B2 | 12/2003 | Zait et al. | |
| 6,859,808 B1 | 2/2005 | Chong et al. | |
| 6,931,390 B1 | 8/2005 | Zait et al. | |
| 6,957,225 B1 | 10/2005 | Zait et al. | |
| 7,103,588 B2 | 9/2006 | Beck et al. | |
| 7,120,638 B1 | 10/2006 | Cesare | |
| 7,143,107 B1 | 11/2006 | Nebres, Jr. | |
| 7,181,438 B1 | 2/2007 | Szabo | |
| 7,213,025 B2 | 5/2007 | Sinclair | |
| 7,305,373 B1 * | 12/2007 | Cunningham et al. | 706/47 |
| 7,319,995 B2 | 1/2008 | Chiang | |
| 7,426,520 B2 | 9/2008 | Gorelik et al. | |
| 2002/0184253 A1 | 12/2002 | Agarwal et al. | |
| 2002/0188604 A1 | 12/2002 | Tada et al. | |
| 2003/0065652 A1 | 4/2003 | Spacey | |
| 2003/0074348 A1 | 4/2003 | Sinclair et al. | |
| 2004/0002989 A1 | 1/2004 | Kaminer | |

(Continued)

OTHER PUBLICATIONS

Jerome Robinson and Barry G. T. Lowden, "Attribute-Pair Range Rules", Dec. 23, 1999.*

*Primary Examiner* — Neveen Abel-Jalil
*Assistant Examiner* — Tarek Chbouki
(74) *Attorney, Agent, or Firm* — Narendra Reddy Thappeta (57) ABSTRACT

Data is maintained indicating which conditions match which data items (e.g., rows) of a data set (e.g., table(s) in a database). When a query is later received, the maintained data is quickly examined to determine the matching data items, thereby enhancing the throughput performance in processing queries directed to the data set.

14 Claims, 7 Drawing Sheets

U.S. PATENT DOCUMENTS

| | | |
|---|---|---|
| 2004/0073581 A1 | 4/2004 | McVoy et al. |
| 2004/0093339 A1 | 5/2004 | Mochizuki |
| 2004/0128287 A1 | 7/2004 | Keller et al. |
| 2004/0153185 A1 | 8/2004 | Tamura et al. |
| 2004/0181533 A1 | 9/2004 | Santosuosso |
| 2004/0220896 A1 | 11/2004 | Finlay et al. |
| 2005/0021503 A1 | 1/2005 | Chiang |
| 2005/0055369 A1 | 3/2005 | Gorelik et al. |
| 2005/0154710 A1 | 7/2005 | Ruhlow et al. |
| 2005/0177553 A1 | 8/2005 | Berger et al. |
| 2005/0198027 A1 | 9/2005 | Hamaguchi |
| 2005/0203887 A1 | 9/2005 | Joshi et al. |
| 2005/0209850 A1 | 9/2005 | Sugitani et al. |
| 2005/0283458 A1 | 12/2005 | Galindo-Legaria et al. |
| 2006/0080285 A1 | 4/2006 | Chowdhuri |
| 2006/0294055 A1 | 12/2006 | Santosuosso |
| 2006/0294098 A1 | 12/2006 | Thomson et al. |
| 2007/0022136 A1 | 1/2007 | Keller et al. |
| 2008/0147628 A1 | 6/2008 | Dettinger et al. |
| 2008/0306920 A1 | 12/2008 | Santosuosso |
| 2009/0094274 A1 | 4/2009 | Gorelik et al. |
| 2009/0254971 A1* | 10/2009 | Herz et al. .................. 726/1 |

* cited by examiner

FIG. 1

| Value | RowId |
|---|---|
| 10 | 00AA |
| 20 | 00AB |
| 30 | 00AC |
| 35 | 00AD |
| 40 | 00AE |
| 50 | 00AF |
| 55 | 00AG |
| 60 | 00AH |
| 65 | 00AI |
| 70 | 00AJ |
| 80 | 00AK |
| 90 | 00AL |
| 100 | 00AM |

| Condition Identifier 410 | Condition 420 |
|---|---|
| C1 | Age > 50 |
| C2 | Age < 50 |
| C3 | Age = 50 |
| C4 | Age between 20 and 50 |

| Value | RowId | Matching Condition |
|---|---|---|
| 10 | 00AA | C2 |
| 20 | 00AB | C2, C4 |
| 30 | 00AC | C2, C4 |
| 35 | 00AD | C2, C4 |
| 40 | 00AE | C2, C4 |
| 50 | 00AF | C3, C4 |
| 55 | 00AG | C1 |
| 60 | 00AH | C1 |
| 65 | 00AI | C1 |
| 70 | 00AJ | C1 |
| 80 | 00AK | C1 |
| 90 | 00AL | C1 |
| 100 | 00AM | C1 |

FIG. 5A

| Condition | Matching rows |
|---|---|
| C1 | OOAG, OOAH, OOAI, OOAJ, OOAK, OOAL, OOAM |
| C2 | OOAA, OOAB, OOAC, OOAD, OOAE |
| C3 | OOAF |
| C4 | OOAB, OOAC, OOAD, OOAE, OOAF |

560 Condition
570 Matching rows
571, 572, 573, 574

EFFICIENCY IN PROCESSING QUERIES DIRECTED TO STATIC DATA SETS

RELATED APPLICATION

The present application is a continuation of and claims priority from co-pending US application Ser. No. 10/908,666, entitled, "IMPROVING EFFICIENCY IN PROCESSING QUERIES DIRECTED TO STATIC DATA SETS", filed on 22 May 2005, and is incorporated in its entirety herewith.

BACKGROUND OF THE INVENTION

1. Field of the Invention

The present invention relates generally to processing queries directed to large data sets, and more specifically to a method and apparatus for improving efficiency in processing queries directed to static data sets.

2. Related Art

Queries are often directed to data sets. For example, an SQL query contains select statements which are intended to retrieve only the data items of interest from a large data set.

Static data sets are created in some environments. Static data sets refer to data sets, which are unlikely to change at least in a reasonably long duration. Data warehouses are example environments in which static data sets are found.

There is a general need to quickly process queries directed to static data sets. For example, a quick response time may be provided to users due to the ability to process queries quickly.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A server provided according to an aspect of the present invention maintains data indicating which rows match each condition of interest. The maintained data can then be quickly used to determine the specific rows that match each subsequently received query if such queries contain the conditions of interest. As a result, queries can be processed quickly.

According to another aspect of the present invention, the server examines each received query to determine commonly occurring conditions, and uses such commonly occurring conditions as conditions of interest. Thus, at least for repeating conditions, the queries may be processed quickly.

The features are particularly useful in which the data sets are static (e.g., in data warehousing applications). However, when the data sets change, the data indicating the rows matching each condition of interest may be updated accordingly. Such processing can potentially be performed off-line so that responses to queries can be provided quickly.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
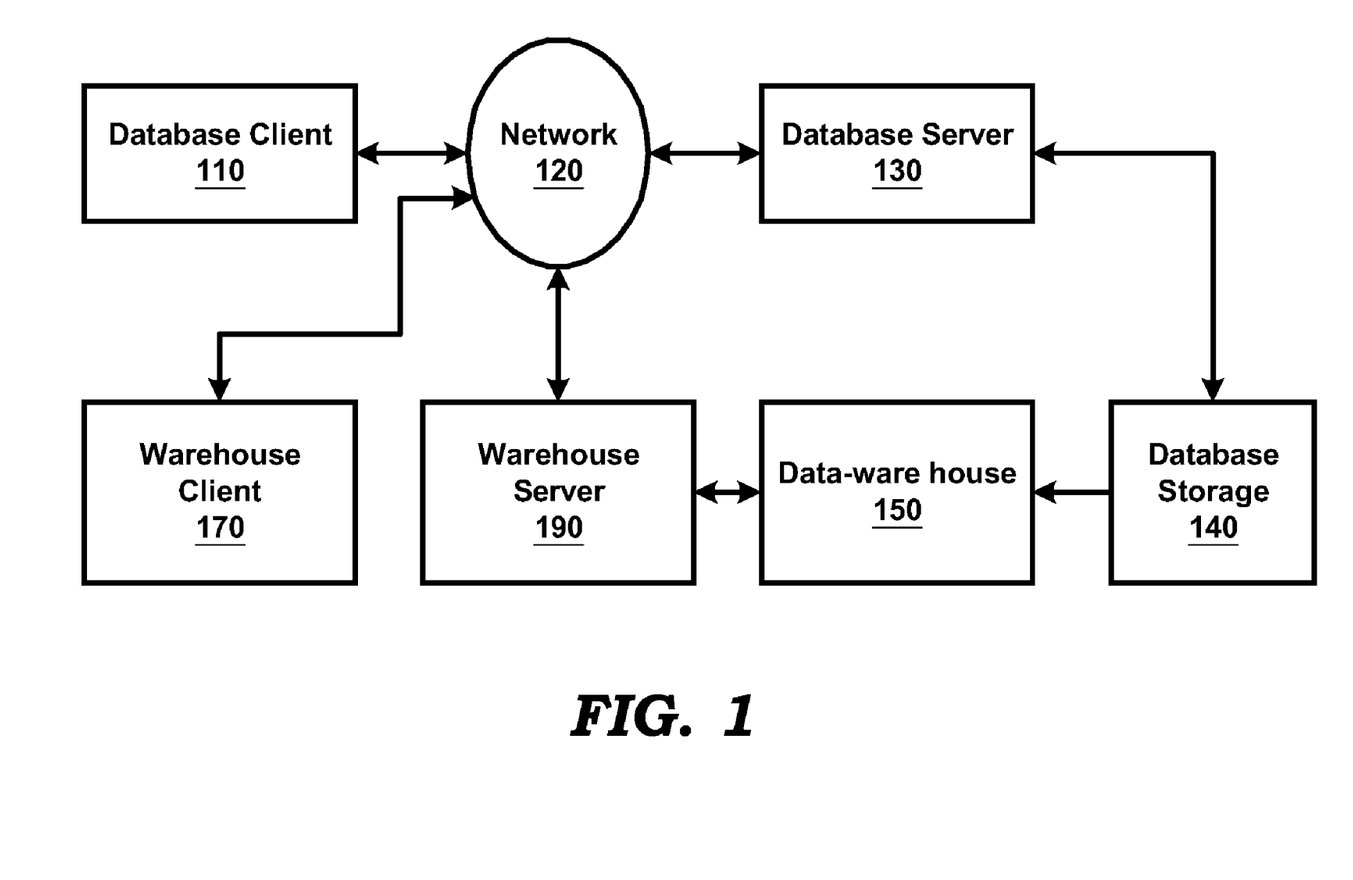
FIG. 1 is a block diagram of an example environment in which various aspects of the present invention can be implemented.

FIG. 1 is a block diagram illustrating an example environment in which various aspects of the present invention can be implemented. The environment is shown containing database client 110, database server 130, database storage 140, data warehouse 150, warehouse client 170 and warehouse server 190. Only representative components (in number and kind) are shown for illustration, even though realistic systems contain many more systems. Each block of FIG. 1 is described below in further detail.

Network 120 provides the connectivity between various systems using protocols such as Internet Protocol (IP). Database client 110 sends transaction requests to database server 130, for example, when executing user applications. The transaction requests generally indicate the corresponding instructions to be executed on database server 130 and any values required to process the instructions.

Database server 130 processes the received transaction request and alters (add, delete and change) the data in database storage 140. Multiple databases (each database containing multiple tables potentially) may be saved in database storage 140 as a result. The data in each database may be viewed as a data set. Such data sets are often transferred to data warehouses once the transactions 'mature' (e.g., completion of a sale).

Data warehouse 150 generally stores static data sets. The data sets may be received from database storage 140, as noted above. Warehouse client 170 sends query requests to warehouse server 190 on network 120. In general, each query contains a set (zero, one or more) of conditions.

Warehouse server 190 processes query requests received from warehouse client 170 by accessing the static data set in data warehouse 150, and sending back the matching (and requested) data. Various aspects of the present invention enable warehouse server 190 to process query requests quickly. The corresponding features will be clearer in comparison to a prior approach, which does not use one or more of the features of the present invention. Accordingly, the corresponding prior approach is described first below.

3. Prior Approach

Figure 2:
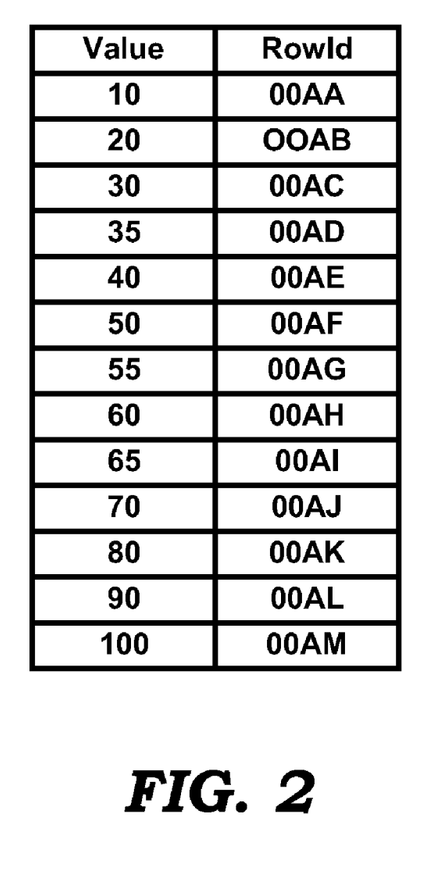
FIG. 2 is a table illustrating the manner in which queries are processed in a prior approach.

FIG. 2 is an index table used to illustrate the manner in which queries are processed in one prior embodiment. The table is shown containing 2 columns—age 210 and row identifiers 260. The table indicates the row identifiers matching each age value. Thus, row 222 indicates that a person of row identifiers 00AB is of age 20.

When a condition contains age, a server searches the table of FIG. 2 to determine the matching columns. For example, when the query condition is 'age>15', the server accesses all the rows (data items) of FIG. 2 to determine that rows with identifiers OOAB, OOAC, OOAD, OOAE, OOAF, OOAG, OOAH, OOAI, OOAJ, OOAK, OOAL, OOAM are matching rows. Once the row identifiers are determined, the server accesses the data set corresponding to the determined rows depending on any other conditions in the query.

One problem with the above technique is that the server may make several accesses to the table of FIG. 2 to determine the matching rows corresponding to each query. In one prior embodiment, the age value is organized according to a B-tree (well known in the relevant arts), and search of the tree is performed to determine the leaf/end node of interest. Thus, accesses are performed corresponding to both searching of the B-tree as well as accessing the leaf nodes. The number of access is of the order of log 2(n), wherein n corresponds to the number of leaf nodes in the tree (or rows in the table).

Such multiple accesses may lead to slower response times due to the processing and access requirements. Various features of the present invention overcome such disadvantages, as described below in further detail.

4. Efficient Query Processing

Figure 3:
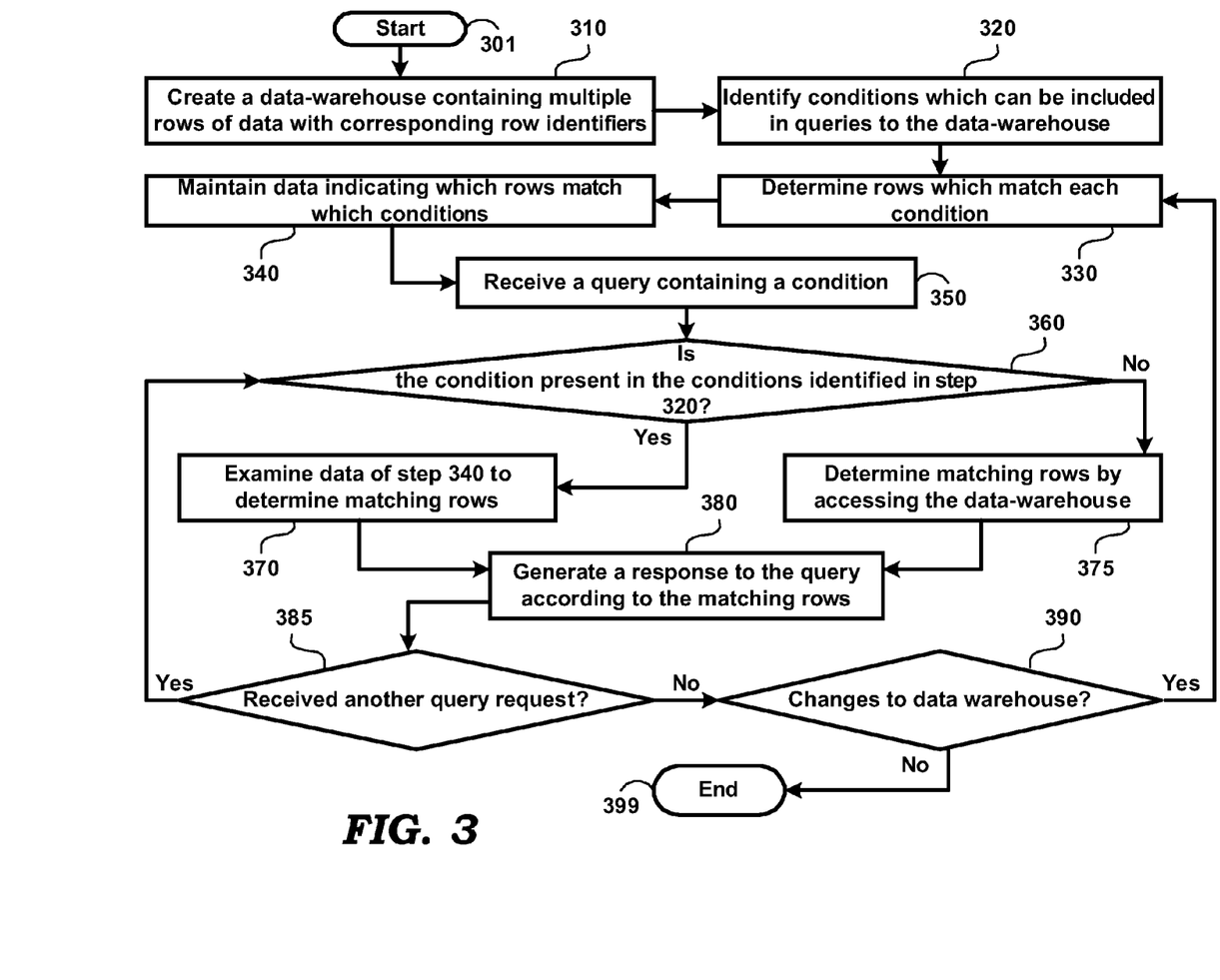
FIG. 3 is a flowchart illustrating the manner in which queries directed to data sets can be processed according to various aspects of the present invention.

FIG. 3 is a flowchart illustrating the manner in which warehouse server 190 may process a query request according to various aspects of the present invention. The flowchart is described with respect to FIG. 1 merely for illustration. However, the approach(es) can be implemented in other systems/environments as well. The flowchart begins in step 301, in which control passes to step 310.

In step 310, a data-warehouse containing multiple rows of data with corresponding row identifiers is created in data warehouse 150. Multiple rows of data are created from data sets received from database storage 140 assuming the data is organized in the form of relational data bases.

In step 320, warehouse server 190 identifies conditions which can be included in queries to the data-warehouse. Query requests sent from warehouse client 170 generally include conditions while accessing specific data sets. Warehouse server 190 may identify such conditions from queries received over a pre-determined time. Alternatively or in addition, the an administrator may specify the conditions. The identified conditions may be stored in data warehouse 150.

In step 330, warehouse server 190 determines which rows match which of the conditions identified in step 320. The rows created in data warehouse 150 may be accessed and examined to determine the rows that match each condition. In step 340, warehouse server 190 maintains data indicating which rows meet each condition. One approach to maintaining of data indicating rows that meet specific conditions is described below with reference to FIG. 5.

In step 350, warehouse server 190 receives a query containing a condition from warehouse client 170. In step 360, warehouse server 190 determines if the condition in the received query is present in the conditions identified in step 320. If the condition in the query received is present in the conditions identified in step 320, control passes to step 370 and to step 375 otherwise.

In step 370, warehouse server 190 examines the data of step 340 to determine the rows matching the condition. Since data is maintained indicating the rows matching each condition (in step 340), ware house server 190 can determine rows matching the condition of step 350 by accessing the data maintained in step 340. Control then passes to step 380.

In step 375, warehouse server 190 determines rows matching the condition in the query by accessing data-warehouse 150. Since conditions in the received query is not identified earlier, larger number of rows in data warehouse 150 may be accessed as compared to such an operation performed in step 370, to determine rows matching the condition of step 350. The information (rows matching for the condition) thus determined can be used to update the data of step 340 (now shown). Control then passes to step 380.

In step 380, warehouse server 190 generates a response to the query according to the matching rows and may send the response to warehouse client 170. In step 385, warehouse server 190 determines whether another query request is received from warehouse client 170. Control passes to step 360 if another query request is received, or to step 390 otherwise.

In step 390, warehouse server 190 determines if there are any changes to data sets in data warehouse. Such determination may be performed techniques such as scheduling of update activities in warehouse server 190. Control passes to step 320, if there are changes or to step 399 otherwise, where the program ends.

It may be appreciated that step 340 can be performed off-line (i.e., before queries are received), and then the responses can be generated quickly if the conditions in query are contained in the conditions identified in step 320. Thus efficiency of processing of queries directed to data sets is improved.

The description is continued with respect to the manner in which data is maintained to indicate the rows matching each identified condition, in an embodiment of the present invention.

5. Rows Matching Each Condition

Figure 4:
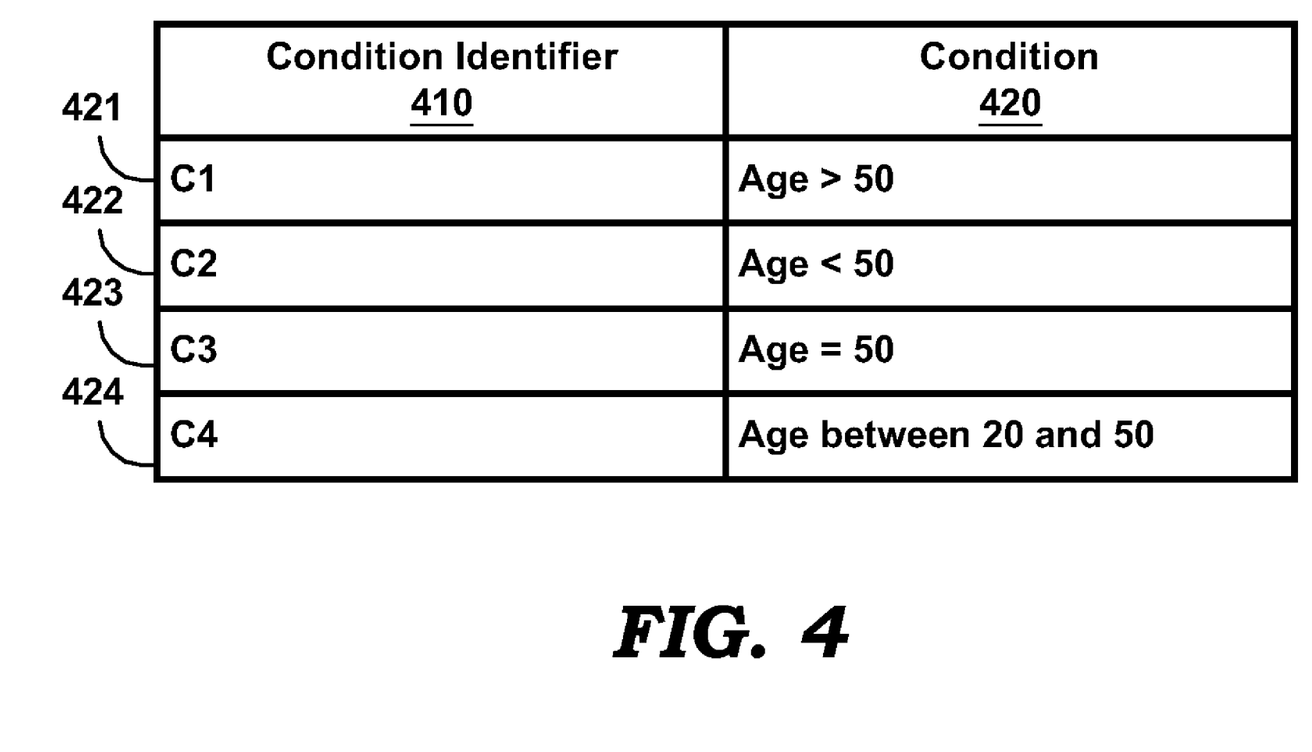
FIG. 4 is a table illustrating a set of example conditions received for processing by a warehouse server.
Figure 5A:
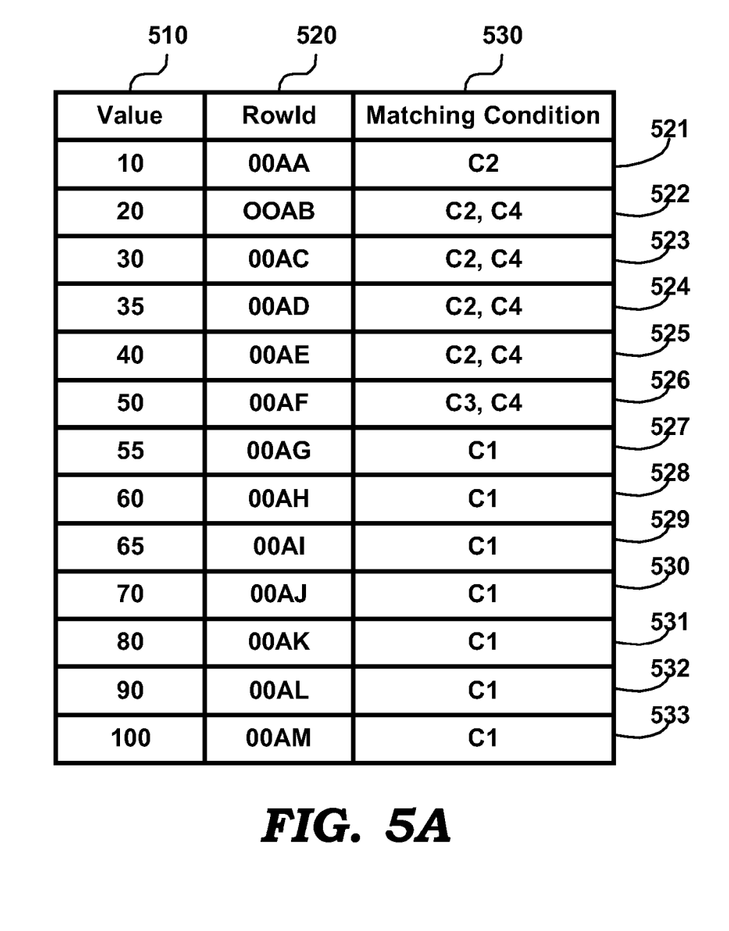
FIGS. 5A and 5B contain tables illustrating the manner in which data is maintained in a data warehouse in an embodiment of the present invention.

FIG. 4 is a table containing a list of example conditions identified (step 320) and FIGS. 5A/5B illustrate the data that may be maintained corresponding to the conditions of FIG. 4 and the data of FIG. 2.

The table of FIG. 4 is shown containing 2 columns—condition identifier 410 and condition 420. As can be readily seen there are four conditions with identifiers of C1-C4 for various age ranges.

FIG. 5A is a table containing example data maintained in data warehouse 150 which indicates the specific conditions matching each row. The table contains 3 columns—age 510, row identifier 520 and matching conditions 530. Columns age 510 and row identifier 520 contain corresponding values of table 2, while column 'matching conditions 530' indicate the conditions (of FIG. 4) each row matches. For example, rows 227 to 237 of FIG. 2 match the condition ('Age>50') of row 422 identified by a corresponding condition identifier C1 (of row 421). Thus, corresponding matching condition 530 for 527 to 537 contains the value as C1.

Similarly, rows 221-225 match condition C2 (row 422) and data is accordingly maintained in corresponding rows of 521-525. Other conditions that each row matches are identified by examining the rows of FIG. 2 to obtain data maintained as indicated in FIG. 5A.

Figure 5B:
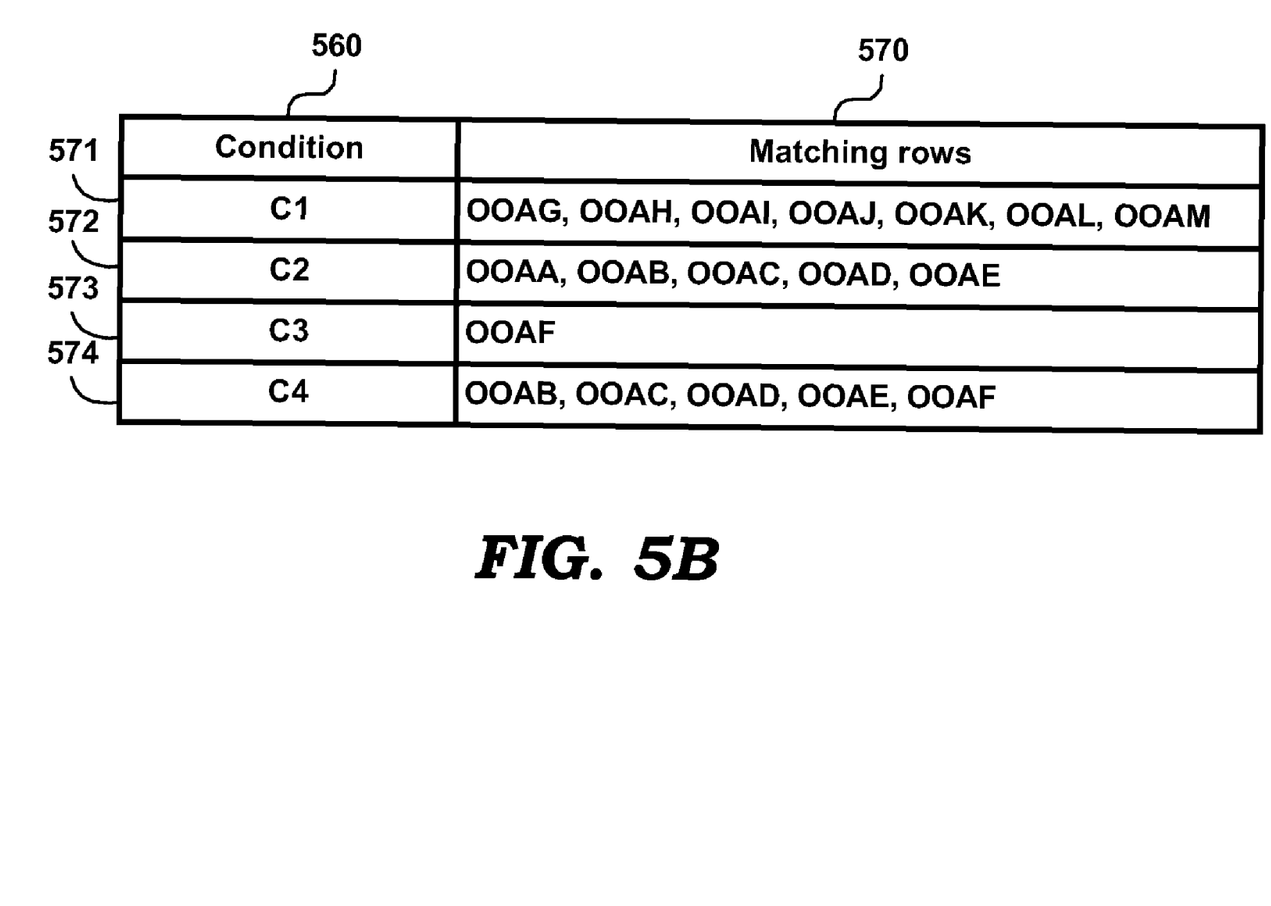

As a further throughput performance enhancement, the data of FIG. 5A can be organized as shown in FIG. 5B. As may be appreciated, the data indicates the specific rows matching each condition of interest. Thus, in row 571, rows with identifier 00AG, 00AH, 00AI, 00AJ, 00AK, 00AL, 00AM are shown matching condition having an identifier of C1.

Thus, when a query containing condition as indicated in row 421 is received from warehouse client 170, warehouse server 190 identifies corresponding condition identifier and later examines data maintained according to FIG. 5A or 5B to determine that rows 527-533 the rows matching the received query.

From the above, it may be appreciated that the number of access is reduced, at least in comparison to the prior approaches noted above. As noted above, the number of accesses to determine matching rows (based on an indexed column) in a B-tree type model is of the order of log 2(N) (N representing the number of rows), whereas the number of accesses (while processing a query in real-time) according to the approaches of FIGS. 5A and 5B is proportion to the number of conditions (which would generally be lot fewer). As a result, queries can potentially be processed quickly according to various aspects of the present invention.

It should also be appreciated that the features of the present invention are described above with respect to a single table and a simple conditions merely for illustration. However the approaches can be extended in the context of complex conditions (each complex condition potentially containing multiple conditions) and also to large data sets (e.g., multiple tables), without departing from the scope and spirit of the present invention, as will be apparent to one skilled in the relevant arts.

It should also be appreciated that the features described above can be implemented in various embodiments. The description is continued with respect to an embodiment in which various features are operative when software instructions are executed.

6. Digital Processing System

Figure 6:
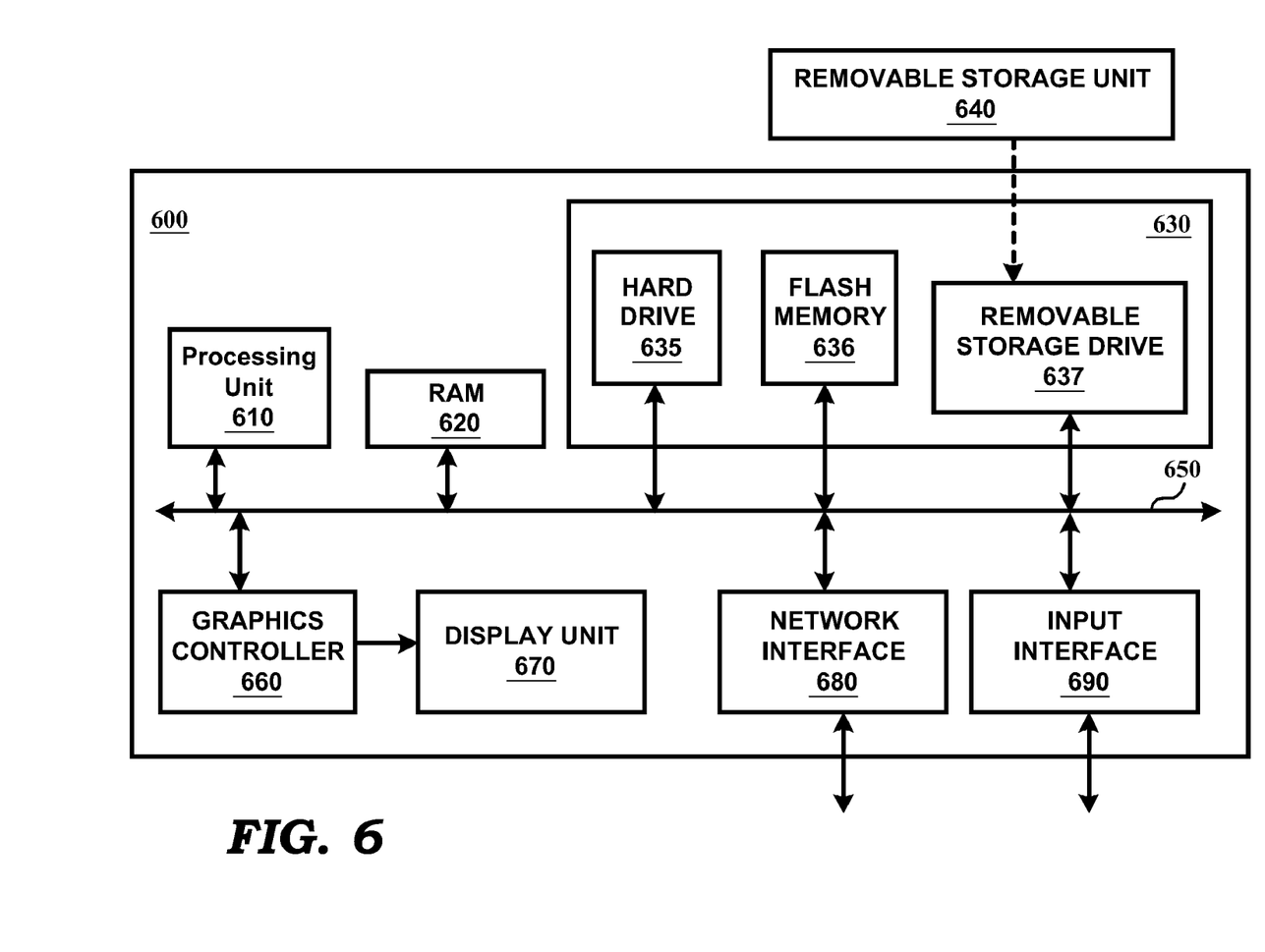
FIG. 6 is a block diagram illustrating an example embodiment in which various aspects of the present invention are operative when software instructions are executed.

FIG. 6 is a block diagram illustrating the details of digital processing system 600 in which various aspects of the present invention are operative by execution of appropriate software instructions. System 600 may correspond to warehouse server 190. System 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a key-board and/or mouse. Network interface 680 provides connectivity to a network (e.g., using Internet Protocol), and may be used to communicate with the other systems of FIG. 1.

Secondary memory 630 may contain hard drive 635, flash memory 636 and removable storage drive 637. Secondary memory 630 may store the data and software instructions (e.g., methods instantiated by each of client system), which enable system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system and a data warehouse system.

What is claimed is:

1. A computer readable storage medium carrying one or more sequences of instructions causing a server to process queries directed to a static data set already stored in the form of a plurality of tables in a data warehouse, wherein each table contains a corresponding set of columns and a corresponding set of rows, wherein each data item is stored in one row of the table with each row of the table being uniquely identified by a corresponding row identifier not formed based on said plurality of data items, wherein execution of said one or more sequences of instructions by one or more processors contained in said server causes said server to perform the actions of:

receiving a plurality of queries directed to said static data set stored in said data warehouse, wherein each of said plurality of queries contains a set of conditions, wherein processing of said plurality of queries requires retrieval of at least some portions of said static data set matching said set of conditions from said data warehouse;

identifying a plurality of conditions commonly occurring in said received plurality of queries, wherein each of said plurality of conditions occurs more number of times in said plurality of queries than conditions not included in said plurality of conditions;

determining which of said plurality of conditions match which of said data items in said static data set by retrieving and inspecting said static data set stored in the form of said plurality of tables in said data warehouse, wherein a match for a condition is determined to be present when a data item retrieved from said data warehouse has a first value for the same column as the condition, and applying said comparison operation on said first value and said comparison value produces a true result;

maintaining a match data external to said static data set, said match data indicating which of said plurality of conditions match which data items in said static data set according to said determining, wherein said match data contains the row identifiers uniquely identifying the matching data items;

receiving a query containing a first condition included in said plurality of conditions;

examining said match data maintained external to said static data set to determine a first set of row identifiers maintained associated with said first condition in said match data, wherein said static data set is not examined to determine said first set of row identifiers;

retrieving from said data warehouse only a first set of data items uniquely identified by said first set of row identifiers based on said examining, wherein only said first set of data items matching said first condition received in said query are retrieved without having to inspect again said static data set stored in said data warehouse based on said match data maintained external to said static data set, wherein said examining is performed in response to receiving said query; and generating a response to said query, said response containing said first set of data items retrieved from said data warehouse after receiving said query, wherein said identifying, said determining and said maintaining are performed before said query is received such that said response can be generated quickly after receiving said query.

2. The computer readable storage medium of claim 1, wherein said match data comprises a plurality of entries, with each entry containing a row identifier corresponding to a single data item and indicating a corresponding set of conditions matching the single data item, whereby said data indicates a corresponding subset of conditions contained in said set of conditions matching each of the row identifiers uniquely identifying respective ones of said plurality of data items, wherein said examining comprises inspecting said plurality of entries for entries containing said first condition to determine said first set of row identifiers matching said first condition.

3. The computer readable storage medium of claim 1 wherein said match data comprises a plurality of entries, with each entry corresponding to a single condition and indicating a set of rows matching the corresponding condition, whereby said data indicates which of said set of conditions match which of said plurality of data items using the corresponding row identifiers, wherein said examining first determines said first set of row identifiers corresponding to said first set of data items matching said first condition based on identifying the entry corresponding to said first condition in said data.

4. The computer readable medium of claim 1, wherein said plurality of queries are received over a duration.

5. A method of processing queries directed to a static data set stored in the form of a plurality of tables in on a storage server, wherein each table contains a corresponding set of columns and a corresponding set of rows, wherein each data item is stored in one row of the table, said static data set containing a plurality of data items which are unlikely to change, wherein each data item is uniquely identified by a corresponding one of a plurality of row identifiers not formed based on said plurality of data items, said method comprising:

receiving a plurality of queries directed to said static data set stored in said storage server, wherein each of said plurality of queries contains a set of conditions, wherein processing of said plurality of queries requires retrieval of at least some portions of said static data set matching said set of conditions from said storage server;

identifying a plurality of conditions commonly occurring in said received plurality of queries, wherein each of said plurality of conditions occurs more number of times in said plurality of queries than conditions not included in said plurality of conditions;

determining which of said plurality of conditions match which of said data items in said static data set by examining retrieving and inspecting said static data set stored in the form of said plurality of tables in said storage server, wherein a match for a condition is determined to be present when a data item retrieved from said storage server has a first value for the same column as the condition, and applying said comparison operation on said first value and said comparison value produces a true result;

maintaining a match data external to said static data set to indicate which of said plurality of conditions match which of said plurality of data items in said static data set according to said determining, wherein said match data contains the row identifiers uniquely identifying the matching data items;

receiving a query containing a first condition included in said plurality of conditions, wherein said query is received after said maintaining;

examining said match data maintained external to said data set to determine a first set of individual row identifiers matching said first condition received in said query, without having to inspect again said static data set stored in said storage server, wherein said first set of row identifiers are contained in said plurality of row identifiers;

retrieving from said storage server only a first set of data items uniquely identified by said first set of row identifiers based on said examining, wherein only said first set of data items matching said first condition received in said query are retrieved without having to inspect again said static data set stored in said storage server based on said match data maintained external to said static data set, wherein said examining is performed in response to receiving said query; and generating a response to said query, said response containing said first set of data items identified by said first set of row identifiers and retrieved from said storage server after receiving said query.

6. The method of claim 5, wherein said match data comprises a plurality of entries, with each entry corresponding to a single data item and indicating a corresponding set of conditions matching the single data item, whereby said match data indicates a corresponding subset of conditions contained in said set of conditions matching each of said plurality of data items, wherein said examining comprises inspecting said plurality of entries for entries containing said first condition to determine said first set of data items matching said first condition.

7. The method of claim 5, wherein said match data comprises a plurality of entries, with each entry corresponding to a single condition and indicating a set of rows matching the corresponding condition, whereby said match data indicates which of said set of conditions match which of said plurality of data items using said row identifiers, wherein said examining first determines a first set of row identifiers corresponding to said first set of data items matching said first condition based on identifying the entry corresponding to said first condition in said match data, wherein each of said first set of data items is retrieved using a corresponding one of said first set of row identifiers.

8. The method of claim 5, wherein said plurality of queries are received over a duration.

9. The method of claim 8, wherein said storage server comprises a data warehouse and said method is performed in a warehouse server designed to access said data warehouse.

10. A computing system comprising:

a database storage to store a data set containing a plurality of data items;

a database client to send a plurality of transaction requests to be performed on said data set;

a database server to receive each of said plurality of transaction requests and to accordingly alter said data set stored in said data storage;

a data warehouse to store said data set in the form of a static data set in a plurality of tables after said data set is determined to not require further alterations, wherein each table contains a corresponding set of columns and a corresponding set of rows, wherein each data item is stored in one row of the table, with each row of the table being uniquely identified by a corresponding row identifier;

a warehouse client to send a plurality of queries to be performed on said static data set; and a warehouse server being operable to:

receive a subset of said plurality of queries containing a corresponding set of conditions, wherein processing of said subset of said plurality of queries requires retrieval of at least some portions of said static data set matching said set of conditions from said data warehouse;

identify a plurality of conditions commonly occurring in said received subset of said plurality of queries, wherein each of said plurality of conditions occurs more number of times in said subset of plurality of queries than conditions not included in said plurality of conditions;

determine which of said plurality of conditions match which of said plurality of data items in said static data set by examining said static data set in said data warehouse, wherein a match for a condition is determined to be present when a data item retrieved from said data warehouse has a first value for the same column as the condition, and applying said comparison operation on said first value and said comparison value produces a true result;

maintain a match data external to said static data set, said match data indicating which of said plurality of conditions match which of said plurality of data items in said static data set according to said determining, wherein said match data contains the row identifiers uniquely identifying the matching data items;

receive a query contained in said plurality of queries, wherein said query contains a first condition included in said plurality of conditions;

examine said match data to determine, without having to inspect again said static data stored in said data warehouse, a first set of data items contained in said static data set and matching said first condition;

retrieve from said data warehouse only said first set of data items in said static data set from said data warehouse based on said examine, wherein only said first set of data items matching said first condition received in said query are retrieved without having to inspect again said static data set stored in said data warehouse based on said match data maintained external to said static data set, wherein said examining is performed in response to receiving said query; and generate a response to said query, said response containing said first set of data items retrieved from said data warehouse after receiving said query.

11. The computing system of claim 10, wherein said warehouse server is implemented external to said data warehouse as a separate unit.

12. The computing system of claim 10, wherein said match data comprises a plurality of entries, with each entry corresponding to a single data item and indicating a corresponding set of conditions matching the single data item, whereby said match data indicates a corresponding subset of conditions contained in said set of conditions matching each of said plurality of data items, wherein to examine said match data said warehouse server is operable to inspect said plurality of entries for entries containing said first condition to determine said first set of data items matching said first condition.

13. The computing system of claim 10, wherein said match data comprises a plurality of entries, with each entry corresponding to a single condition and indicating a set of rows matching the corresponding condition, whereby said match data indicates which of said set of conditions match which of said plurality of data items using said row identifiers, wherein to examine said match data said warehouse server is operable to first determine a first set of row identifiers corresponding to said first set of data items matching said first condition based on identifying the entry corresponding to said first condition in said match data, said warehouse server further operable to retrieve only said first set of data items in all of the data items in said data set from said data warehouse, wherein each of said first set of data items is retrieved using a corresponding one of said first set of row identifiers.

14. The computing system of claim 10, wherein said plurality of queries are received over a duration.

* * * * *